US007515038B2

(12) United States Patent
Mouri

(10) Patent No.: US 7,515,038 B2
(45) Date of Patent: Apr. 7, 2009

(54) SYSTEM FOR WARNING AGAINST FORGETTING TO PULL OUT INFORMATION RECORDING MEDIUM

(75) Inventor: Norihiko Mouri, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 266 days.

(21) Appl. No.: 11/353,050

(22) Filed: Feb. 14, 2006

(65) Prior Publication Data

US 2007/0093104 A1 Apr. 26, 2007

(30) Foreign Application Priority Data

Oct. 20, 2005 (JP) ............................ 2005-305732

(51) Int. Cl.
*B60R 25/10* (2006.01)

(52) U.S. Cl. .................. 340/426.34; 340/569; 340/438; 340/460; 340/461; 439/188

(58) Field of Classification Search .............. 340/426.3, 340/569, 438, 460, 461, 426.34; 439/188
See application file for complete search history.

(56) References Cited

FOREIGN PATENT DOCUMENTS

| | | | | |
|---|---|---|---|---|
| JP | 09-007011 | A | | 1/1997 |
| JP | 11-039438 | A | | 2/1999 |
| JP | 02000315267 | | * | 5/1999 |
| JP | 11-039438 | A | | 12/1999 |
| JP | 2001-014500 | A | | 1/2001 |
| JP | 2003-203259 | A | | 7/2003 |
| KR | 10-2004-3436 | A | | 1/2004 |

* cited by examiner

*Primary Examiner*—Tai T Nguyen
(74) *Attorney, Agent, or Firm*—Sughrue Mion, PLLC

(57) ABSTRACT

A system for warning against forgetting to pull out an information recording medium can improve working efficiency upon mounting a navigation unit and an on-board radio unit onto a vehicle, and notify a user of an alarm that causes no uncomfortable feeling, and is still inexpensive to manufacture. A drive unit switch detects when a control part is turned off, also detects, through a communication line, a residual state of an IC card with respect to an on-board device, and notifies the result of the detection to a the voice generation part. When the IC card is "absent" in the on-board device, the control part interrupts the supply of power to the on-board device through the on-board device power supply line.

9 Claims, 4 Drawing Sheets

SYSTEM FOR WARNING AGAINST FORGETTING TO PULL OUT INFORMATION RECORDING MEDIUM

BACKGROUND OF THE INVENTION

1. Field of the Invention

The present invention relates to a system for warning against forgetting to pull out an information recording medium (hereinafter also referred to simply as a "forget-to-pullout information recording medium warning system") that serves to prevent a user from forgetting to pull out an information recording medium from an on-board radio unit in case where a drive unit of a vehicle is stopped with the information recording medium remaining in the on-board radio unit.

2. Description of the Related Art

ETC (Electronic Toll Collection) systems are becoming increasingly prevalent, and the number of vehicles with on-board devices in the form of on-board radio units installed thereon is increasing in recent years.

In order to use ETC systems, it is necessary for a user to insert an ETC card in the form of an IC card into an on-board device installed on a vehicle, whilst when leaving the vehicle, the user needs to pull out the ETC card from the on-board device for the purpose of anti-theft.

In addition, although not only ETC but also a variety of other services using on-board devices and IC cards are being studied now and in the future, it is undesirable, in any of these services, to leave an IC card in a vehicle because of fear such as theft of the card.

Accordingly, for example, as a forget-to-pullout card warning system, there has been known one in which when it is detected that a card exists in an on-board device installed on a vehicle and a drive unit of the vehicle is in a stopped state, an alarm is provided to a user so as to draw attention by using a notification part such as a buzzer, a voice system, etc., mounted on the on-board device (see, for example, a first patent document (Japanese patent application laid-open No. H11-39438)).

In such a forget-to-pullout card warning system as stated above, however, in order to achieve the above function, it is necessary to detect the state of remaining of the card (i.e., the state of the card remaining in the on-board device) after the drive unit of the vehicle is stopped, i.e., after a power supply is turned off. Thus, the on-board device must be connected to not only a power supply line to which a drive unit switch of the vehicle is connected, but also an on-board battery backup power supply line which is connected to an on-board battery so as to be always supplied with electric power. As a result, there is a problem of poor workability when the on-board device is installed on the vehicle.

Moreover, in case where a navigation unit is installed on the vehicle, it is necessary to connect the power supply line and the backup power supply line to the navigation unit, similar to the on-board device, thus posing another problem that the working efficiency is remarkably deteriorated.

Further, although the number of vehicles with navigation units installed thereon is increasing in recent years, there is also a further problem as stated below. That is, an alarm as referred to above is issued by the on-board device itself, so there is generally a great difference in tone quality between a voice guidance from the navigation unit and that issued by the on-board device during operation of the drive unit of the vehicle, and hence users feel an uncomfortable sensation and are not able to obtain a sufficient degree of satisfaction.

Furthermore, in order to make an IC card remaining in the interior of an on-board device difficult to see from outside of a vehicle, many users generally arrange the main body of the on-board device in a place difficult to see from outside of the vehicle, such as in the vicinity of the feet of a driver, a glove box or the like. In this case, however, there is a still further problem, too, that even if the on-board device issues a warning of forgetting to pull out a card therefrom, the users can not easily hear the warning because of the arrangement of the on-board device in such a place.

Additionally, providing a notification function for each of the navigation unit and the on-board device will impose a double investment on users, so there is a problem of accordingly increased cost, too.

SUMMARY OF THE INVENTION

Accordingly, the present invention is intended to obviate the problems as referred to above, and has for its object to provide a system for warning against forgetting to pull out an information recording medium, which is capable of improving the efficiency of working upon installing a navigation unit and an on-board radio unit on a vehicle, issuing an alarm or warning that is not uncomfortable to users, and reducing the cost of manufacture.

Bearing the above object in mind, according to the present invention, there is provided a system for warning against forgetting to pull out an information recording medium, the system including: a battery that is installed on a vehicle; a navigation unit that is installed on the vehicle; an on-board radio unit that is installed on the vehicle with an information recording medium being attached thereto and removed therefrom; a drive unit switch that is connected to a battery for controlling to drive and stop a drive unit that is mounted on the vehicle for driving thereof; a control part that is connected to the drive unit switch through a power supply line, and to the on-board radio unit through a communication line and an on-board radio unit power supply line; and a notification part that is mounted on the navigation unit for notifying a residual state of the information recording medium to a user. The control part detects when the drive unit switch has been turned off, also detects the residual state of the information recording medium with respect to the on-board radio unit through the communication line thereby to notify it to the notification part, and interrupts the supply of power to the on-board radio unit through the on-board radio unit power supply line when the information recording medium is "absent".

With the system for warning against forgetting to pull out an information recording medium according to the present invention, there are obtained the following advantageous effects. That is, the efficiency of working upon installing the navigation unit and the on-board radio unit on the vehicle can be improved, and an alarm or warning not uncomfortable to users can be issued, while reducing the cost of manufacture.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Figure 1:
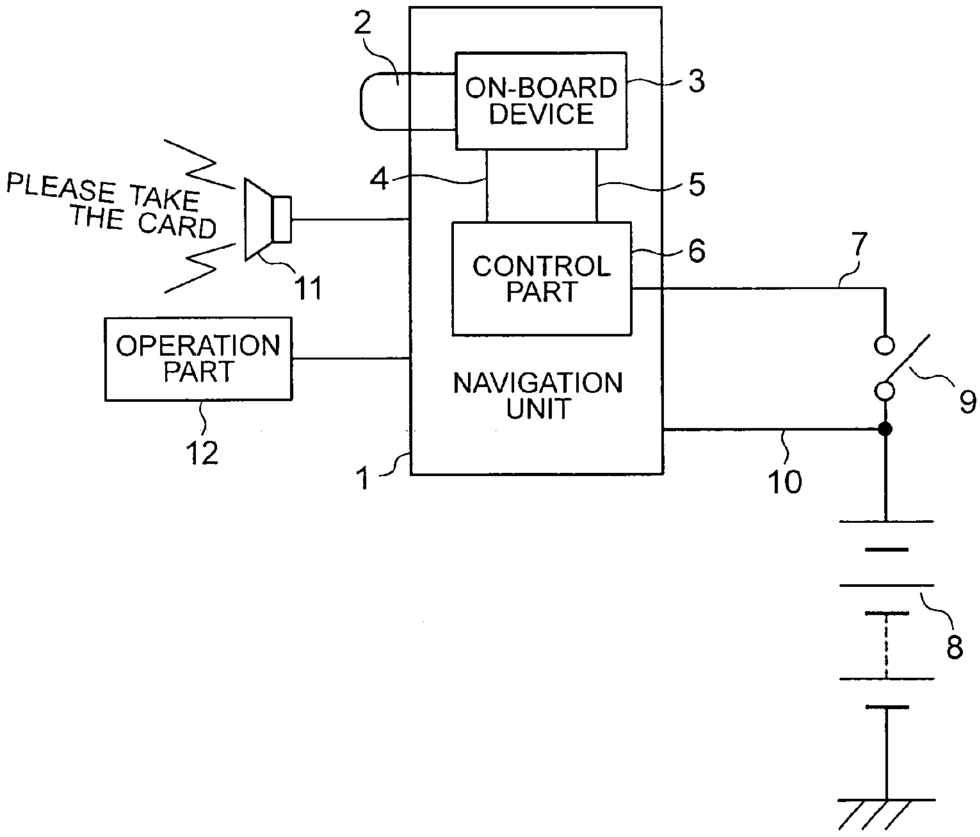
FIG. 1 is a block diagram of a system for warning against forgetting to pull out an IC card (hereinafter referred to as a forget-to-pullout IC card warning system) according to a first embodiment of the present invention.

Now, preferred embodiments of the present invention will be described in detail while referring to the accompanying drawings. Throughout figures in the drawings, the same or corresponding members or parts are identified by the same reference numerals or characters.

Embodiment 1

FIG. 1 is a block diagram of a forget-to-pullout IC card warning system according to a first embodiment of the present invention.

In the forget-to-pullout IC card warning system which constitutes a forget-to-pullout information recording medium warning system, an on-board radio unit in the form of an on-board device 3 and a control part 6 are arranged in a navigation unit 1 that is installed on a vehicle. An information recording medium in the form of an IC card 2 is able to be inserted into and removed from the on-board device 3, and the control part 6 is connected to the on-board device 3 through a communication line 4 and an on-board radio unit power supply line in the form of an on-board device power supply line 5.

The control part 6 is connected to a battery 8 installed on the vehicle through a power supply line 7. A drive unit switch 9 is arranged in the power supply line 7 for controlling to drive and stop a drive unit that is mounted on the vehicle for driving thereof. The navigation unit 1 is connected to the battery 8 through a backup power supply line 10 so that electric power is always fed from the battery 8 to the navigation unit 1 through the backup power supply line 10.

On the navigation unit 1, there is mounted a voice generation part 11 that is a notification part for notifying a user of the residual state of the IC card 2 (i.e., whether or not the IC card 2 is remaining in the on-board device 3.

Also, on the navigation unit 1, there is mounted an operation part 12 by which the user can control to turn on and off the operation of the voice generation part 11.

The control part 6 detects, through the power supply line 7, when the drive unit switch 9 is turned off. Also, the control part 6 detects, through the communication line 4, the residual state of the IC card 2 with respect to the on-board device 3, and notifies the voice generation part 11 of the residual state of the IC card 2 thus detected.

In addition, the control part 6 interrupts the supply of power to the on-board device 3 through the power supply line 7 and the on-board device power supply line 5 when the IC card 2 is "absent" in the on-board device 3.

Here, note that the IC card 2 has information for charge payment stored therein. The charge payment here includes the payment of tolls for expressways used with ETC, the payment of fees for parking lots, the payment of charges in various drive-through shops (including fast food shops, gas stations, etc.), and so on.

Figure 2:
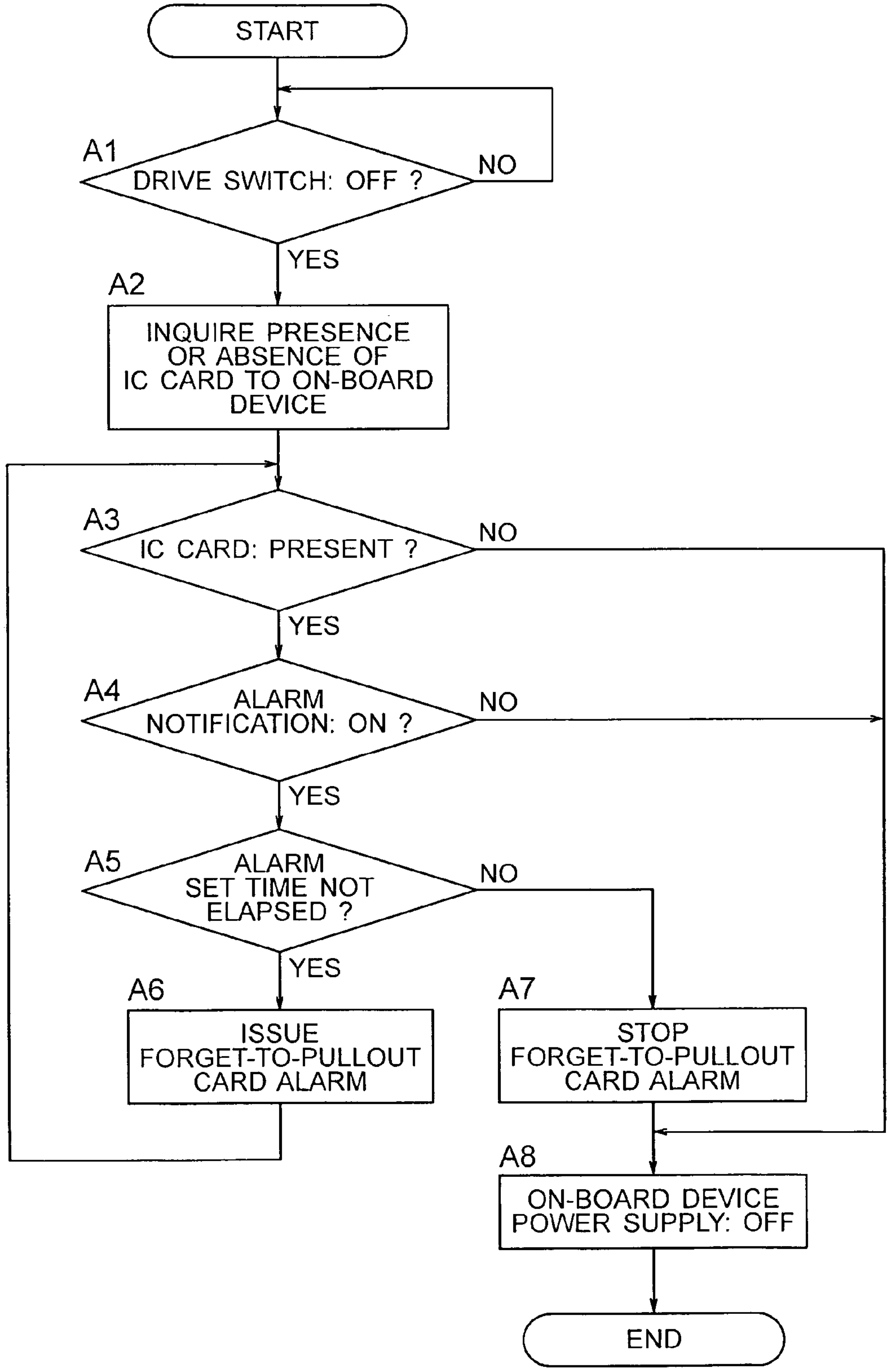
FIG. 2 is a flow chart illustrating the operation of the forget-to-pullout IC card warning system shown in FIG. 1.

Next, reference will be made to the operation of the forget-to-pullout IC card warning system of the above configuration while referring to a flow chart shown in FIG. 2.

The navigation unit 1 always monitors the state of the drive unit switch 9 by means of the control part 6 (step A1).

When detecting, through the power supply line 7, that the drive unit switch 9 is turned off, the control part 6 makes an inquiry about the residual state of the IC card 2 to the on-board device 3 through the communication line 4 (step A2).

The control part 6 receives from the on-board device 3 the information of the "presence" or "absence" of the IC card 2 in the on-board device 3 (step A3), and when the IC card 2 receives a response of "absence", the supply of power to the on-board device 3 through the on-board device power supply line 5 is turned off (step A8), while terminating the control program.

In case where a setting is made beforehand by the operation part 12 in such a manner that an alarm to prevent against forgetting to pull out a card (hereinafter referred to as a forget-to-pullout card prevention alarm) is not issued (step A4), the control part 6 turns off the power supply of the on-board device 3, and terminates the control program even upon receipt of a response of the "presence" of the IC card 2.

In case where it is set beforehand such that a forget-to-pullout card prevention alarm can be issued, an alarm set time is counted or measured, and when the alarm time has not elapsed (step A5), the control part 6 notifies the state of the IC card 2 remaining in the on-board device 3 to the voice generation part 11, where a message "Please take the card" for instance is issued by voice so that a forget-to-pullout card prevention alarm is notified to the user (step A6).

When the alarm time has elapsed or the IC card 2 has been pulled out from the on-board device 3, the control part 6 stops, at that time, the notification to the user by the voice generation part 11, and also stops the forget-to-pullout card prevention alarm (step A7). Then, the control part 6 turns off the power supply of the on-board device 3, and terminates the control program.

As described in the foregoing, according to the forget-to-pullout IC card warning system of the first embodiment of the present invention, the control part 6 detects that the drive unit switch 9 has been turned off, and then detects, through the communication line 4, the residual state of the IC card 2 with respect to the on-board device 3 (i.e., whether the IC card 2 is remaining in the on-board device 3), and notifies the result of the detection to the voice generation part 11. In addition, when the IC card 2 is "absent" in the on-board device 3, the control part 6 interrupts the supply of power to the on-board device 3 through the on-board device power supply line 5, and electric power is supplied to the on-board device 3 through the control part 6, too.

Accordingly, in the case of the forget-to-pullout IC card warning system of the first embodiment of the present invention, workability or the efficiency of working at the time when the navigation unit 1 having the function of the on-board device 3 as well is fitted or mounted to the vehicle is similar to that of a known navigation unit having no on-board device function.

That is, the power supply line 7, which is connected to the drive unit switch 9 of the vehicle, and the backup power supply line 10, which is connected to the battery 8 so as to be always fed with electric power, need only be respectively connected to the navigation unit 1, so the connection workability of the navigation unit 1 is unchanged from that of the known one, and the entire connection workability of the forget-to-pullout IC card warning system of this embodiment can be simplified as compared with a known one that has an on-board device and a navigation unit separately arranged in parallel to each other.

Moreover, since the on-board device 3 is built from the start into the navigation unit 1, the installation space can be made compact, and the man-hour of assembling operation can be reduced.

Further, the user can learn through a voice generated by the voice generation part 11 that the IC card 2 remains in the on-board device 3, so the tone quality of the voice at that time is identical with that generated at the time of driving of the drive unit, i.e., a voice generated from the voice generation part 11 as a navigation function such as route guidance, etc.

Accordingly, the user can learn that the IC card 2 remains in the on-board device 3, without feeling a sense of discomfort in tone quality.

Furthermore, the voice generation part 11 has an alarm notification function in the on-board device 3 and an information notification function in the navigation unit 1 at the same time, so the use of the single part 11 suffices and the cost of manufacture is reduced accordingly.

In addition, when the IC card 2 has been pulled out from the on-board device 3 after the notification of the residual state of the IC card 2 to the user by the voice generation part 11, the control part 6 stops the notification to the user by the voice generation part 11. Accordingly, the user can learn without fail that the IC card 2 has been pulled out from the on-board device 3.

Also, provision is made for the operation part 12 which is mounted on the navigation unit 1, and by which the user can control to turn on and off the operation of the voice generation part 11. With this provision, for example, even in case where the driver turns off the drive unit switch 9 with the IC card 2 remaining in the on-board device 3, it is unnecessary to warn or notify this to the user by voice when the user recognizes such a fact, and hence the present invention is able to deal with such a situation in an appropriate manner.

Figure 3:
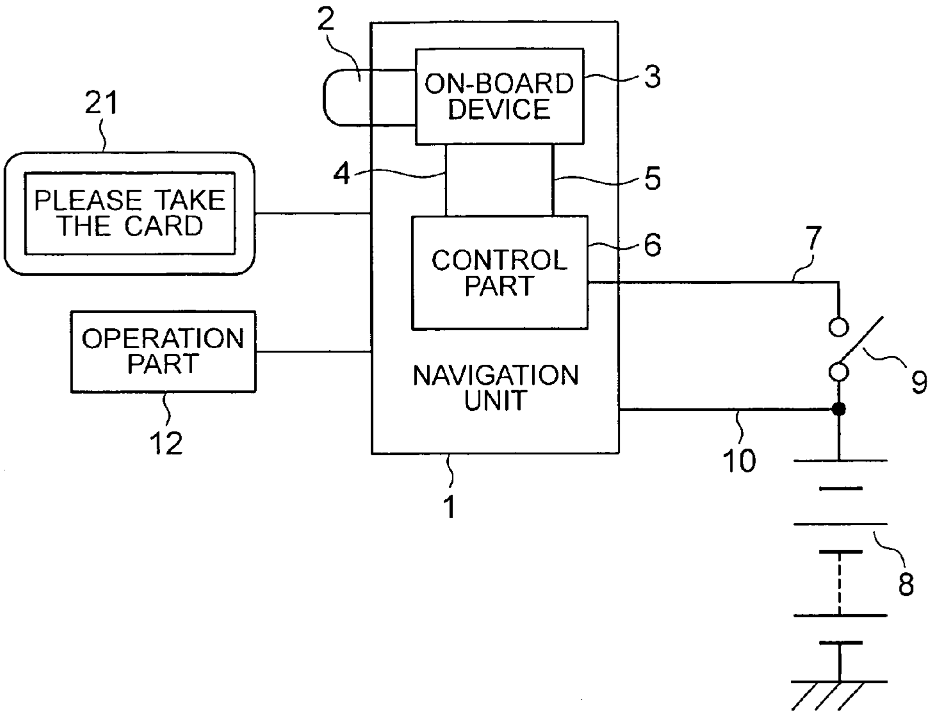
FIG. 3 is a block diagram showing another example or a modified form of the forget-to-pullout IC card warning system of FIG. 1.

Here, note that in the description of the above-mentioned first embodiment, reference has been made to the case where the voice generation part 11 is used as a notification part, but a display part 21 may be used as the notification part, as shown in FIG. 3.

In this case, a message "Please take the card" for example is displayed in the display part 21, so it is possible to visually notify the user that the IC card 2 remains in the on-board device 3, without being influenced by noise or the like.

Figure 4:
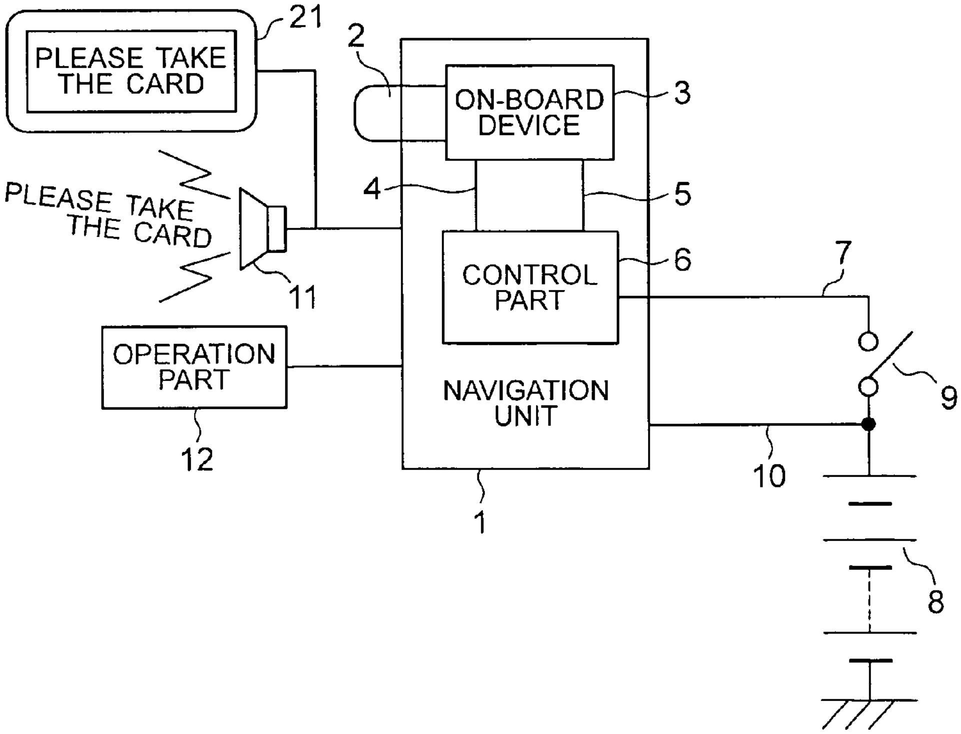
FIG. 4 is a block diagram illustrating a further example or modified form of the forget-to-pullout IC card warning system of FIG. 1.

Moreover, as shown in FIG. 4, the voice generation part 11 and the display part 21 may be used as a notification part.

In this case, a message "Please take the card" for example is uttered in the voice generation part 11, and at the same time, the same message "Please take the card" is displayed in the display part 21, whereby it is possible to notify, both aurally and visually, the user that the IC card 2 remains in the on-board device 3.

Embodiment 2

Figure 5:
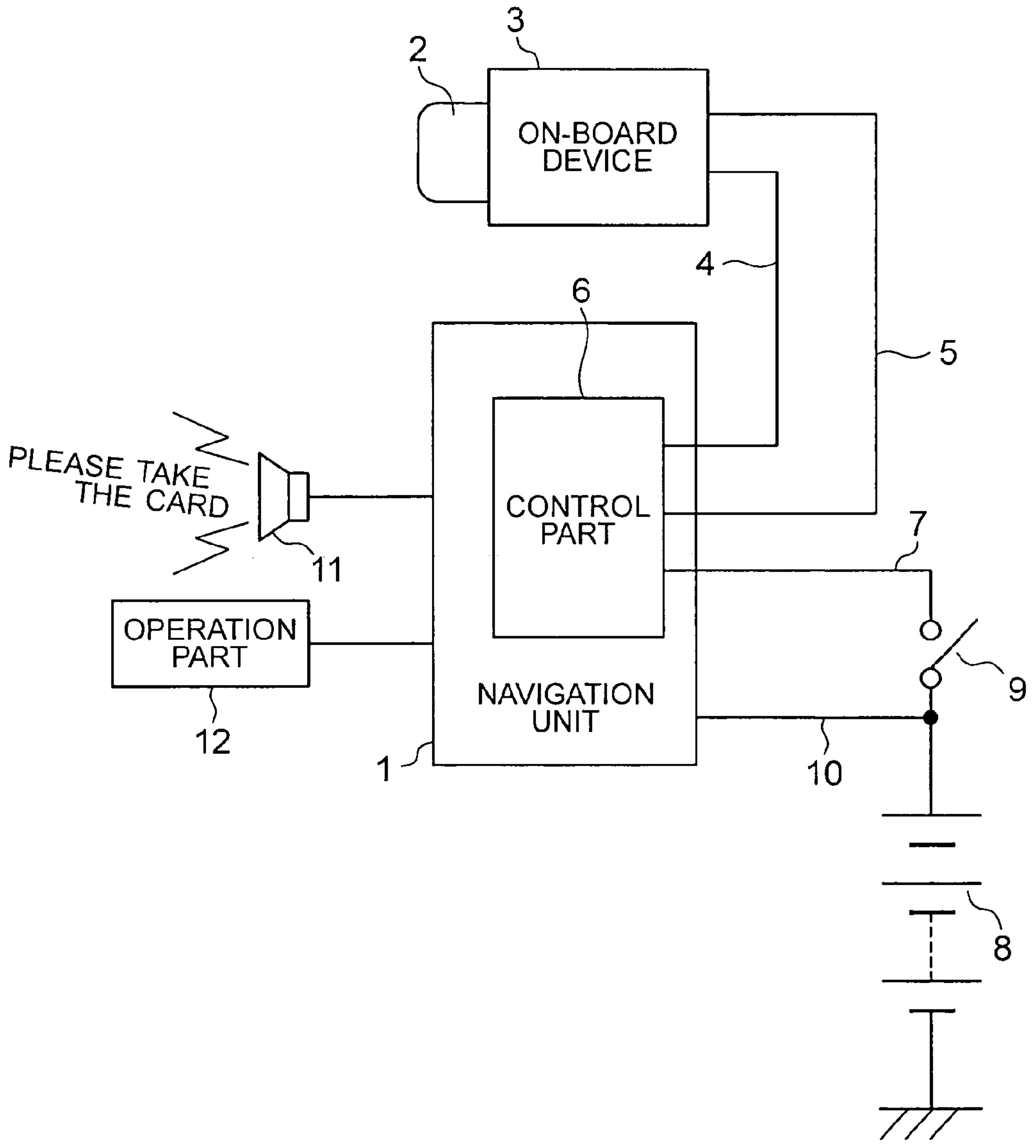
FIG. 5 is a block diagram of a forget-to-pullout IC card warning system according to a second embodiment of the present invention.

FIG. 5 is a block diagram of a forget-to-pullout IC card warning system according to a second embodiment of the present invention.

This embodiment is different from the above-mentioned forget-to-pullout IC card warning system of the first embodiment in that an on-board device 3 is arranged separately from a navigation unit 1, but is similar thereto in the other configuration.

In this second embodiment, the on-board device 3 is electrically connected to the navigation unit 1, which is arranged at a location away from the on-board device 3, are electrically connected to each other through a communication line 4 and an on-board device power supply line 5.

In this embodiment, the operation and the advantageous effects substantially similar to those of the first embodiment can be achieved, and the separate arrangement of the navigation unit 1 and the on-board device 3 serves to improve the degree of freedom of installation of the on-board device 3, so that the on-board device 3 can be installed in a place not easily seen from outside of the vehicle.

In addition, even if the on-board device 3 is installed in a place where it can not be easily seen even by the user in the vehicle, the user can recognize or hear an alarm by voice generated from the voice generation part 11.

Here, note that in this embodiment, too, a display part or a combined part having both a voice generation function and a display function may be used as a communication part, other than the voice generation part 11.

In the above-mentioned respective embodiments, reference has been made only to the case where the communication line 4 is used for mutually communicating the residual state of the IC card 2 in the on-board device 3 between the on-board device 3 and the control part 6, but the communication line 4 can of course be used for notifying the control part 6 of the information that has been received by the on-board device 3 from outside of the vehicle through radio waves, or for notifying the information possessed by the on-board device 3 to the control part 6.

Also, although in the above-mentioned embodiments, reference has been made to the case where the forget-to-pullout IC card warning systems employing the IC card 2 with information for charge payment stored therein are used as forget-to-pullout information recording medium warning systems, the present invention is not of course limited to such systems, but can be applied to other systems in which an IC card is used for other purposes than the payment of charges, such as for example the entry and exit management of parking lots through communication of data such as the entry and exit times of vehicles between the IC card and a roadside device.

Moreover, the present invention can also be applied to a forget-to-pullout information recording medium warning system in which a road administrator grasps the travel times of a vehicle through communication between an IC card and roadside devices that are arranged in a specific area.

Further, the present invention can be similarly applied even when information recording mediums such as optical memory cards, magnetic cards, etc., are used other than IC cards.

While the invention has been described in terms of preferred embodiments, those skilled in the art will recognize that the invention can be practiced with modifications within the spirit and scope of the appended claims.

What is claimed is:

1. A system for warning against forgetting to pull out an information recording medium, said system comprising:

a battery that is installed on a vehicle;

a navigation unit that is installed on said vehicle;

an on-board radio unit that is installed on said vehicle with an information recording medium being attached to the on-board radio unit and removed the on-board radio unit;

a drive unit switch that is connected to the battery for controlling to drive and stop a drive unit that is mounted on said vehicle for driving thereof;

a control part that is connected to said drive unit switch through a power supply line, and to said on-board radio unit through a communication line and an on-board radio unit power supply line; and a notification part that is mounted on said navigation unit for notifying a residual state of said information recording medium to a user;

wherein said control part detects when said drive unit switch has been turned off, also detects the residual state of said information recording medium with respect to said on-board radio unit through said communication line thereby to notify it to said notification part, and interrupts the supply of power to said on-board radio unit through said on-board radio unit power supply line when said information recording medium is absent.

2. The system for warning against forgetting to pull out an information recording medium as set forth in claim 1, wherein said on-board radio unit is built in said navigation unit.

3. The system for warning against forgetting to pull out an information recording medium as set forth in claim 1, wherein said on-board radio unit is arranged separately from said navigation unit.

4. The system for warning against forgetting to pull out an information recording medium as set forth in claim 1, wherein said control part stops the notification to said user by said notification part when said information recording medium has been pulled out from said on-board radio unit after said notification part has notified the residual state of said information recording medium to said user.

5. The system for warning against forgetting to pull out an information recording medium as set forth in claim 1, further comprising:

an operation part that is mounted on said navigation unit in order for said user to control to turn on and off the operation of said notification part.

6. The system for warning against forgetting to pull out an information recording medium as set forth in claim 1, wherein said notification part comprises a voice generation part.

7. The system for warning against forgetting to pull out an information recording medium as set forth in claim 1, wherein said notification part comprises a display part.

8. The system for warning against forgetting to pull out an information recording medium as set forth in claim 1, wherein said notification part comprises a voice generation part and a display part.

9. The system for warning against forgetting to pull out an information recording medium as set forth in claim 1, wherein said on-board radio unit comprises an on-board device for charge payment, and said information recording medium comprises an IC card with information for charge payment stored therein.

* * * * *